United States Patent [19]

Lukas et al.

[11] Patent Number: 5,408,843
[45] Date of Patent: Apr. 25, 1995

[54] VEHICULAR COOLING SYSTEM AND LIQUID COOLED CONDENSER THEREFOR

[75] Inventors: Henry Lukas, Racine, Wis.; Zalman P. Saperstein, Lake Bluff, Ill.; Charles J. Rogers, Racine, Wis.

[73] Assignee: Modine Manufacturing Co., Racine, Wis.

[21] Appl. No.: 217,496

[22] Filed: Mar. 24, 1994

[51] Int. Cl.6 .............................................. B60H 1/32
[52] U.S. Cl. ........................................ 62/244; 62/506
[58] Field of Search ........................ 62/506, 239, 244

[56] References Cited

U.S. PATENT DOCUMENTS

| | | | |
|---|---|---|---|
| 3,355,908 | 12/1967 | Anglin | 62/506 X |
| 3,926,000 | 12/1975 | Scofield | 62/506 X |
| 4,494,384 | 1/1985 | Lott | 62/506 X |
| 5,201,285 | 4/1993 | McTaggart | 123/41.31 |

OTHER PUBLICATIONS

Garrett Systems Engineering Approach to Diesel Engine Turbo-Charge Air Cooling.
SAE Technical Paper Series—A new Approach to Sizing and Packaging of the Heat Exchangers for the Passenger Car.
System Design Considerations for Low Temperature Aftercooling; 821051.

Primary Examiner—William E. Tapolcai
Attorney, Agent, or Firm—Wood, Phillips, VanSanten, Clark & Mortimer

[57] ABSTRACT

Energy conservation may be increased and emission production reduced in a cooling system for the internal combustion engine (10) of a vehicle that includes a high temperature radiator (50) and a lower temperature radiator (38) aligned so that airflow will flow serially through the two, passing through the lower temperature radiator (38) before passing through the higher temperature radiator (50). A liquid cooled condenser (30) is in circuit with the lower temperature radiator (38) and provides condensed refrigerant to an evaporator (20). A compressor (34) is in circuit with the condenser (30) and the evaporator (20) to provide for air conditioning and a charge air cooler (42) for the vehicle engine (10) is located in series with the lower temperature radiator (38) and the refrigerant condenser (30) to provide for improved cooling of charge air. The vehicle engine 10 is in series with the high temperature radiator 50 as is a heater 14.

9 Claims, 3 Drawing Sheets

VEHICULAR COOLING SYSTEM AND LIQUID COOLED CONDENSER THEREFOR

FIELD OF THE INVENTION

This invention relates to vehicular cooling systems. It also relates to a novel liquid cooled condenser for use in a vehicular cooling system.

BACKGROUND OF THE INVENTION

The last two decades have seen increasing concern about the effects of internal combustion engines which, of course, are the overwhelming choice for the power plant of vehicles of all sizes and types. For one, there are concerns related to energy conservation. To address these concerns, considerable efforts have been made to increase the efficiency of vehicles. In many instances, this has been accomplished by reducing the weight of a given vehicle. In many other instances, this has been accomplished by improving the efficiency of power consuming systems on the vehicle. In still other instances, this has been accomplished by increasing the aerodynamic efficiency of the shape of the vehicle, particularly at the frontal area thereof.

Still other concerns center about the environment. Hydrocarbon and $NO_x$ emissions have long been regarded as major pollutants of the atmosphere.

Environmental concerns have also been addressed in a number of ways. For one, by increasing the efficiency of power consuming systems on a vehicle, less fuel is required to be consumed to produce the power necessary to run such systems and that, in turn, reduces emissions. For another, the combustion cycle and/or engine configuration has been addressed to improve combustion efficiency which in turn results in emission reduction. For still another, efforts have been made to reduce the maximum attained temperature of lubricants, i.e., engine oil, during vehicle operation to minimize the contribution to total emissions provided by the lubricants.

A number of the problems to be solved, and approaches to their solution, are interactive. For example, improved efficiency of power consuming systems on a vehicle reduces fuel consumption which serves both energy conservation concerns and environmental concerns.

The present invention is directed to maximizing vehicular engine related or driven system efficiency by integrating vehicular systems to attain such improved efficiency.

SUMMARY OF THE INVENTION

It is the principal object of the invention to provide a new and improved cooling system for an internal combustion engine. More specifically, it is an object of the invention to provide such a new and improved cooling system for a vehicle. It is also an object of the invention to provide a new and improved liquid cooled condenser that is ideally suited for use in such a system.

According to one facet of the invention, there is provided a cooling system that includes a high temperature radiator having a first coolant flow path adapted to be in circuit with a vehicular engine and a first cooling air path. Also included is a lower temperature radiator having a second coolant flow path and a second cooling air path upstream of the cooling air path of the high temperature radiator such that cooling air will flow both through the second cooling air path and through the first cooling air path. A liquid cooled condenser having a third coolant flow path in series with the second coolant flow path is provided. The liquid cooled condenser also has a first refrigerant flow path. The system includes a refrigerant evaporator having a second refrigerant flow path connected to the first refrigerant flow path. A refrigerant compressor is connected in circuit with the condenser and the evaporator. Also, a charge air cooler for the vehicular engine is provided. The charge air cooler includes a fourth coolant flow path in series with the second and third coolant flow paths. The system is completed with a heater having a fifth coolant flow path adapted to be in series with a vehicular engine as well as in series with the first coolant flow path. The system provides excellent cooling for the engine, allowing the same to operate without overheating under high loads to improve engine efficiency. The system also provides for efficient air conditioning of vehicular spaces and the opportunity to achieve excellent cooling of lubricating oil.

In one embodiment of the invention, the cooling air is caused to flow serially, first through the second cooling air path and subsequently through the first cooling air path.

A preferred embodiment of the invention contemplates that the lower temperature radiator include first and second spaced, elongated headers with tubes extending between the headers and defining the first coolant flow path. One of the headers includes spaced, internal headers at its ends and additional tubes within the one header extending between the spaced internal headers and defining therewith the first refrigerant flow path.

Preferably, the one header is tubular and the additional tubes are flattened tubes.

The invention contemplates the use of spacers within the one header which engage the flattened tubes to support the same.

In one embodiment of the invention, part of the second coolant flow path serves as the third coolant flow path.

The invention, according to another facet thereof, contemplates a liquid cooled condenser for use in a refrigeration system. The condenser includes an elongated, round or partly round tube and a pair of headers, one at each end of the round or partly round tube and sealing the same. Each header has a plurality of elongated slots. The slots in one header are aligned with the slots in the other header. The elongated tubes are disposed within the round or partly round tube and extend between the headers with the ends of each flattened tube being sealingly received in corresponding slots in the headers. Caps are provided and seal against respective headers oppositely of the elongated tubes and a pair of refrigerant ports for the caps are provided with at least one port in one of the caps. The construction is completed by a pair of spaced coolant ports in the round or partly round tube.

In one embodiment of the invention, there is a refrigerant port in each of the caps.

In one embodiment of the invention, the round or partly round tube is a combined header and tank and one of the spaced ports is defined by a series of tube receiving slots in the combined header and tank.

Preferably, the round or partly round tube, the headers and the flattened tubes are aluminum and are brazed in assembled relation.

In one embodiment of the invention, the flattened tubes are in at least two rows with a single flattened tube at each end of the rows and staggered with respect thereto.

As will be seen, the present invention allows more efficient packaging of under-the-hood heat exchangers. It also increases air circuit effectiveness, reduces parasitic losses and increases overall thermal efficiency.

Other objects and advantages will become apparent from the following specification taken in connection with the accompanying drawings.

DESCRIPTION OF THE PREFERRED EMBODIMENT

Figure 1:
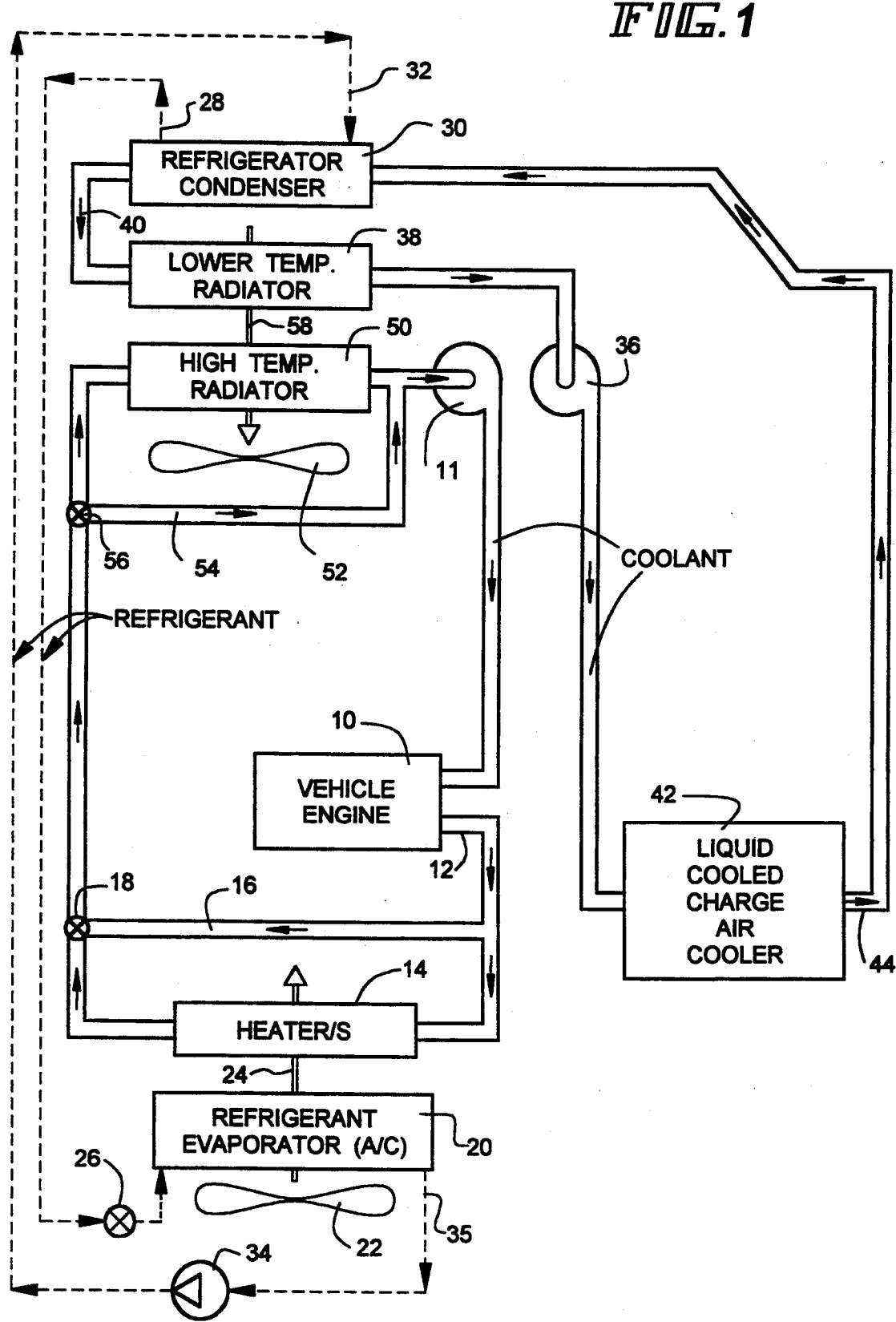
FIG. 1 is a block diagram of a cooling system made according to the invention.

An exemplary embodiment of the invention as illustrated in FIG. 1 as part of a cooling system for systems associated with a vehicle powered by a vehicle engine 10 of the internal combustion sort. As is typical of such engines, the same is liquid cooled and to this end includes a coolant system provided with a coolant pump 11 which is operative to pump relatively cool coolant into the coolant jacket of the engine 10. Hot coolant emerges from the engine 10 at a port 12 and is directed to a conventional heater 14 that may be located within the vehicle cab. Also included is a bypass loop 16 for bypassing the heater 14. A control valve 18 of conventional construction may be employed to control the relative rates of flow of hot hot coolant from the engine 10 through the heater 14 and the bypass 16.

The heater 14 may be in line with a conventional refrigerant evaporator 20 such that an electrically operated fan 22 may drive air in the direction of an arrow 24 serially through the evaporator 20 and the heater 14 within the vehicle cab to heat or cool the same, depending upon whether the heater 14 or the evaporator 20 is being employed.

The evaporator 20 receives liquid, or a mixture of liquid and gaseous refrigerant through an expansion valve 26. The expansion valve 26 is connected to the outlet 28 of a refrigerant condenser 30. As will be seen, the refrigerant condenser 30 is a liquid cooled condenser which is to say that condensation of refrigerant within the condenser 30 is effected by heat exchange with a liquid as opposed to, for example, ambient air.

Refrigerant vapor is provided to the condenser 30 via an inlet 32 which in turn is connected to a compressor 34. The compressor 34 is, in turn, connected to the outlet 35 of the evaporator 20.

It will be appreciated from the foregoing description that the heater 14 includes a coolant flow path as well as a cooling air flow path. Similarly, the evaporator 20 includes a refrigerant flow path as well as an air flow path. The refrigerant condenser 30 includes a refrigerant flow path as well as a liquid coolant flow path. Needless to say, the flow paths in each of these heat exchangers are in heat exchange relation with one another as is well known.

Returning to the refrigerant condenser 30, the same receives liquid coolant by action of a pump 36. The liquid coolant supplied to the pump 36 is taken from the coolant flow path of a radiator 38. The radiator 38 is not the radiator used for cooling the coolant to the vehicle engine 10 as will be seen and operates at a lower temperature than the radiator employed for cooling the engine coolant. It thus may be characterized as a lower temperature radiator 38.

Coolant heated by the condensation process within the condenser 30 is provided to the lower temperature radiator 38 on a line 40 to be cooled therein.

The outlet from the pump 36 is returned to the condenser 30 in any suitable loop. As illustrated in FIG. 1, the loop includes a liquid cooled charge air cooler 42. Those skilled in the art are aware that a charge air cooler is employed to cool combustion air being provided to the vehicle engine 10 after the same has had its pressure elevated as, for example, a result of operation of a turbocharger or super charger. A charge air cooler increases engine efficiency. As combustion air is being compressed by operation of a turbocharger or a super charger, it is also heated and this results in any given volume of the now heated and pressurized air having a lesser density, and thus a lesser oxygen content, than an identical volume of air at the same pressure but at a lower temperature. Thus, by cooling the air after it has been pressurized by the turbo charger or super charger, its density, and thus its oxygen content, may be increased allowing more fuel to be combusted, and thus more power generated for any given volume of combustion air consumed.

The relatively low temperature coolant in the loop is ideally suited for use as a coolant for charge air in the charge air cooler and accomplishes cooling of the charge air more efficiently than would be obtained if the system included an air cooled charge air cooler while meeting clean air standards for $NO_X$ emissions.

It will also be appreciated that other types of heat exchangers associated with the vehicle could be located in the low temperature loop. For example, one or more oil coolers as, for example, engine oil or transmission oil coolers could be placed in the loop as desired.

The system also includes a high temperature radiator 50 which cools coolant for the engine 10. The high temperature radiator 50 thus has a coolant flow path as well as a conventional cooling air flow path. Preferably, the radiators 38 and 50 are aligned and ganged such that a single fan 52 may drive cooling air serially through the two, first through the cooling air flow path of the lower temperature radiator 38 and then through the cooling air path of the high temperature radiator 50. In some instances, however, the radiator 38 and 50 may be placed side-by-side so cooling air is blown through both in parallel paths. This arrangement may be desirable from the cost of manufacture standpoint and typically will require each radiator 38, 50 to have an increased core depth over that required where the radiators 38 and 50 are serially aligned.

Conventionally, the radiator 50 is provided with a bypass 54 controlled by a thermostatic valve 56.

A system such as illustrated in FIG. 1 provides a great improvement in performance. The improvement in performance is believed to be due to two factors. For one, there is reduced air side pressure drop in the front end heat exchangers in the vehicle. This results in an increase in air flow through the front end heat exchangers so that the temperature of the air exiting the low temperature radiator 38 and entering the high temperature radiator 50 has a lower temperature than the air exiting a charge air cooler/condenser and entering the radiator in a conventional installation. Thus, an increase in engine cooling potential is provided by the invention. Two, more efficient fan driving is obtained.

The reduction in air side pressure drop is a direct result of the system configuration. In particular, in a conventional vehicle provided with air conditioning and a charge air cooler, the condenser for the air conditioning system and the charge air cooler are air cooled units and would be located in ganged relation with the high temperature radiator 50. The presence of these elements in the path of air flow generated by the fan 52 and indicated by an arrow 58 creates considerable resistance to air flow, accounting for a relatively high air side pressure drop. By replacing these components with a single lower temperature radiator, and using highly efficient liquid cooling of both refrigerant and charge air, a lesser air side pressure drop is realized and greater efficiencies are obtained.

And, as noted previously, oil coolers can be located in the low temperature loop to eliminate restrictions on engine temperatures which in turn would lead to better energy efficiency and possibly lower exhaust emissions.

Figure 2:
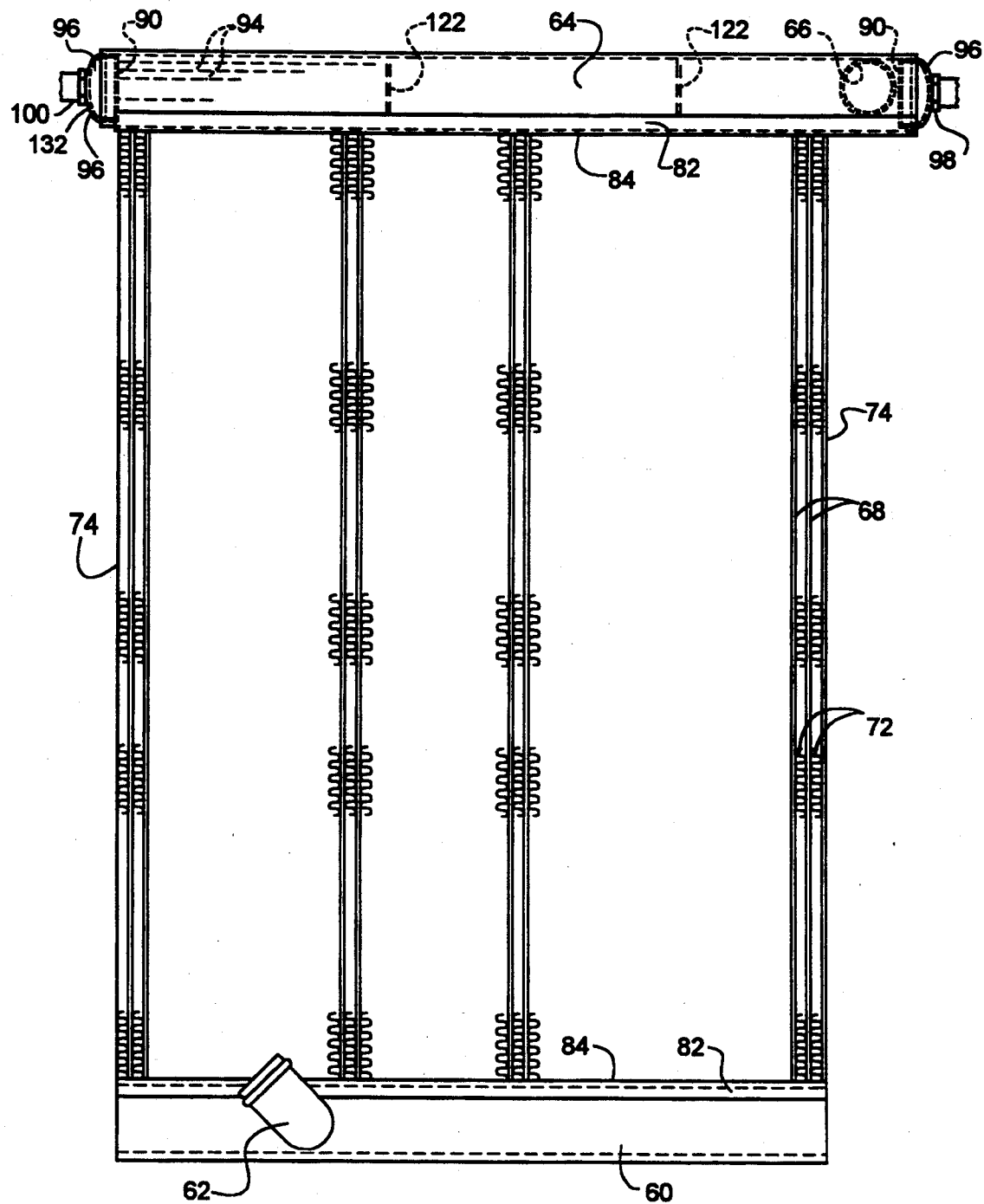
FIG. 2 is an elevational view of a combined lower temperature radiator and liquid cooled condenser that may be used in the invention.

As illustrated in FIG. 1, the refrigerant condenser 30 and the lower temperature radiator 38 are separate structures; and according to one embodiment of the invention, that sort of relationship is expressly contemplated. However, also contemplated by the invention, in its preferred form, is a combined refrigerant condenser and lower temperature radiator as is illustrated in FIG. 2.

Figure 3:
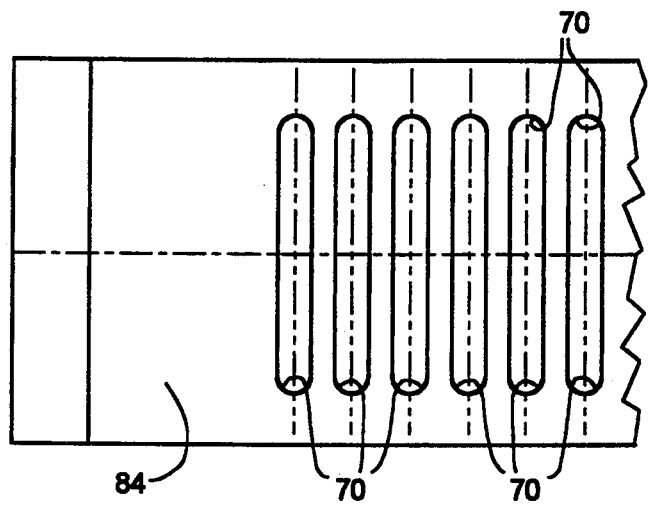
FIG. 3 is an enlarged fragmentary view of part of a header used in the heat exchanger illustrated in FIG. 2.
Figure 4:
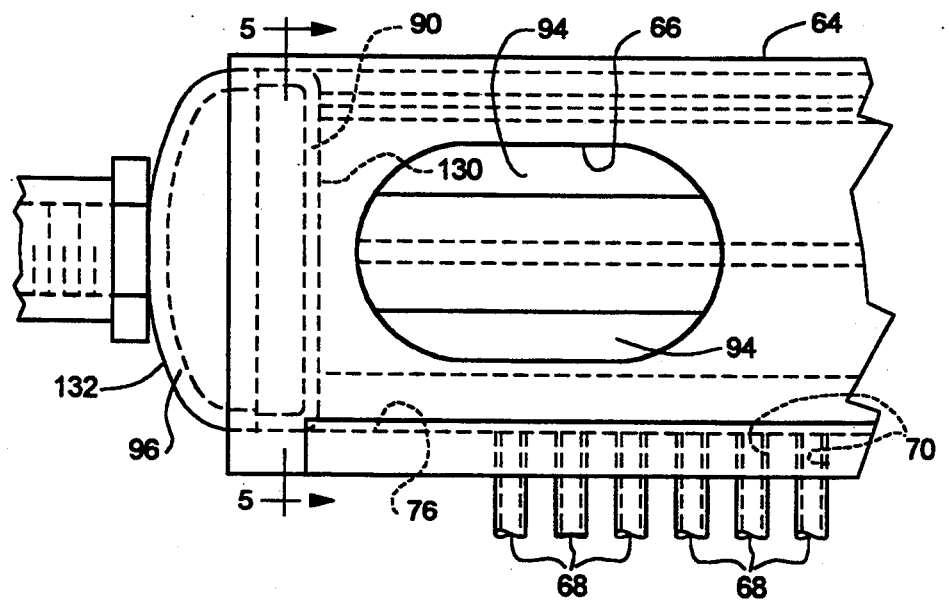
FIG. 4 is an enlarged fragmentary view of the header assembled to other components to provide a liquid cooled condenser.
Figure 5:
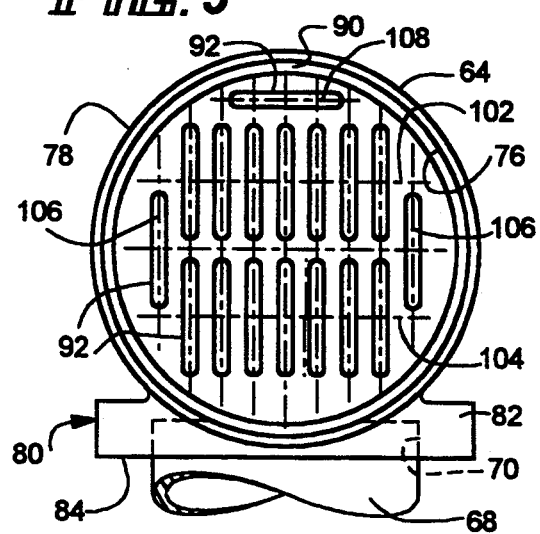
FIG. 5 is a sectional view taken approximately along the line 5—5 in FIG. 4.

More specifically, a combined condenser/radiator according to the invention includes a lower header 60 having a coolant port 62 and a parallel, spaced, upper header 64 having a coolant port 66. The headers 60 and 64 are in fact combined headers and tanks and preferably will be tubular having a cylindrical, round or partly round interior. A plurality of flattened tubes 68 extend in parallel with one another between the headers 60 and 64 to have respective ends sealingly received in aligned slots 70 (FIGS. 3-5). Serpentine fins 72 are disposed between and bonded to adjacent ones of the tubes 68 and at the sides of the core, to side pieces 74.

The cross section of the headers 64 is perhaps best illustrated in FIG. 5. The header 60 typically will, but need not necessarily, have the same cross section. The header 64 includes, as mentioned previously, a cylindrical interior surface 76 as well as a cylindrical outer surface 78 which extends perhaps as much as 270°. The remaining part of the outer surface is designated 80 and comprises a foot 82 which may be either formed integrally with the header 64 or simply added thereto by bonding such as brazing or welding. The foot 82 includes a planar surface 84 in which the slots 70 are located. As can be seen in FIG. 5, the slots 70 are formed in the feet 82 to sufficient depth so as to open to the interior surface 76 to the interior of the respective headers 60, 64 and collectively serve as a port to the interior of the respective header.

The structure comprising the low temperature radiator part of a combined condenser/radiator has been described. The condenser part is contained within the upper header 64, although it could be placed in the lower header 60 if desired. Specifically, and with reference to FIGS. 2, 4 and 5, at each end of the header 64, a shallow cup-shaped header 90 is located. The headers 90 have the same peripheral shape as the interior of the header 60, 64 in which they are received and are sealed thereto at respective ends thereof. As seen in FIG. 5, each of the headers 90 includes a plurality of elongated, tube-receiving slots 92. Corresponding slots 92 in one of the headers are aligned with corresponding slots in the other.

Elongated, flattened tubes 94 (FIGS. 2 and 4) have their ends received and sealed in the slots 92 and extend between the headers 90 within the header 64. End caps 96 are fitted to the ends of the header 64 to define tanks and sealed against corresponding ends of the headers 90. Each of the end caps 96 has a cylindrical round or partly round shape corresponding to that of the header 60, 64 in which it is received. Each end cap 96, in the preferred embodiment, includes a port. As seen in FIG. 2, a vapor inlet port 98 is provided at one end of the header 94 while a liquid refrigerant port 100 is provided at the other. It will thus be appreciated that a single pass, liquid cooled condenser is defined. At the same time, those skilled in the art will recognize that it would be possible to provide a multiple path liquid cooled condenser by placing both of the ports 98 and 100 in a single one of the caps 98 and providing a suitable baffle between the two.

Returning to FIG. 5, in order to maximize the surface area of the tubes 94 exposed to liquid coolant within the header 64, a preferred embodiment of the invention contemplates that the slots 92 be arranged in at least two rows including one having a center line designated 102 and a second having a center line designated 104. At both ends of the rows defined by the lines 102 and 104, a single one of the slots 92, designated 106, is located.

In addition, on the side of the rows defined by the lines 102 and 104 opposite from the foot 82, a single slot 108 oriented at 90° to the remainder of the slots, may be located.

Figure 6:
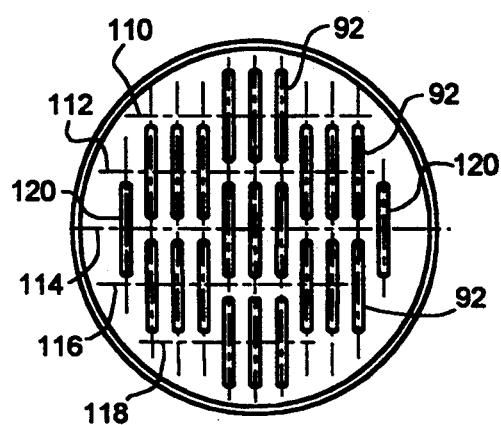
FIG. 6 is a view similar to FIG. 5 but illustrating a modified embodiment of the invention.

FIG. 6 illustrates a modified embodiment of a header that may be used to provide a different tube pattern from that illustrated in FIG. 5. In this embodiment, five rows of tube slots 92 are provided. They are represented by center lines respectively designated 110, 112, 114, 116, and 118. Again, it will be observed that as respects the rows 112 and 116, at their ends are single tube slots 120 which correspond approximately to the tube slots 106.

In this embodiment, the rows are not continuous but have other rows interleaved with one or more rows. Again, the arrangement maximizes the surface area of the tubes 94 by maximizing the number of tubes 94.

The structure is completed by the use of spacer 122 (FIG. 2) that are disposed at two or more intervals along the length of the tubes 94. The spacers typically will be notched to partially fit about the tubes 94 as well as extend to contact part of the interior wall 76 of the header 64 and thereby provide support for the tubes 94.

In order to obtain maximum cooling, the port 62 should be the inlet port for hot coolant and the port 66 the outlet port. This enables coolant to be cooled as it passes through the tube 68 by air passing through the radiator before it even comes in contact with the tubes 94.

In a highly preferred embodiment of the invention, the components are all formed of aluminum for light weight and good thermal conductivity. They are assembled together by brazing. Thus, typically, the tubes 94 will have braze clad exteriors. Each of the headers 90 will have one surface 130 that is braze clad. Similarly, the caps 96 will have a surface 132 that is braze clad.

Additionally, the exterior surfaces of the tubes 68 may be braze clad.

Preferably, a brazing process employing potassium fluo aluminate complexes as brazing flux, and commercially known as the NOCOLOK ® brazing process is employed.

From the foregoing, it will be appreciated that a cooling system made according to the invention achieves improved efficiencies in vehicular applications and thus is a step forward in meeting energy conservation concerns as well as environmental concerns. Moreover, in the preferred embodiment of the invention wherein a combined condenser/radiator is employed, spacial concerns on a vehicle are addressed by eliminating the need for space for a condenser separate from the radiator. At the same time, where spacial concerns are not present, a liquid cooled condenser per se may be virtually identically to the header 64 with all the appurtenances that make it useful as the condenser, simply by eliminating the slots 70 and, in lieu thereof, providing a separate, second coolant port.

We claim:

1. A cooling system for the internal combustion engine of a vehicle, comprising:
   a high temperature radiator having a first coolant flow path adapted to be in circuit with an engine, and a first cooling air path;
   a lower temperature radiator having a second coolant flow path and a second cooling air path upstream of the cooling air path of said high temperature radiator such that cooling air will flow serially first through said second cooling air path and subsequently said first cooling air path;
   a liquid cooled condenser having a third coolant flow path in series with said second coolant flow path, and a first refrigerant flow path;
   a refrigerant evaporator having a second refrigerant flow path connected to said first refrigerant flow path;
   a refrigerant compressor connected in circuit with said condenser and said evaporator;
   a charge air cooler for the engine and including a fourth coolant flow path in series with said second and third coolant flow paths; and
   a heater having fifth coolant flow path adapted to be in series with the engine and in series with said first coolant flow path.

2. The cooling system of claim 1 wherein said lower temperature radiator includes first and second spaced elongated headers with tubes extending between the headers and defining said second coolant flow path, and one of said headers includes spaced internal headers at its ends; and additional tubes within said one header extending between said spaced internal headers and defining therewith said first refrigerant flow path.

3. The cooling system of claim 2 wherein said one header is tubular and said additional tubes are flattened tubes.

4. The cooling system of claim 3 further including spacers within said one header and engaging said flattened tubes to support the same.

5. The cooling system of claim 1 wherein said one header is tubular and said additional tubes are flattened tubes.

6. The cooling system of claim 5 further including spacers within said one header and engaging said flattened tubes to support the same.

7. The cooling system of claim 1 wherein part of said second coolant flow path serves as said third coolant flow path.

8. A cooling system for the internal combustion engine of a vehicle, comprising:
   a high temperature radiator having a first coolant flow path adapted to be in circuit with an engine, and a first cooling air path;
   a lower temperature radiator having a second coolant flow path and a second cooling air path;
   said radiators being disposed that cooling air will flow through both said second cooling air path and said first cooling air path;
   a liquid cooled condenser having a third coolant flow path in series with said second coolant flow path, and a first refrigerant flow path;
   a refrigerant evaporator having a second refrigerant flow path connected to said first refrigerant flow path;
   a refrigerant compressor connected in circuit with said condenser and said evaporator;
   a charge air cooler for the engine and including a fourth coolant flow path in series with said second and third coolant flow paths; and
   a heater having a fifth coolant flow path adapted to be in series with the engine and in series with said first coolant flow path.

9. The cooling system of claim 8 wherein said radiators are back-to-back with said lower temperature radiator being upstream of said high temperature radiator so that said cooling will flow serially first through said second cooling air path and second through said first cooling air path.

* * * * *